(No Model.)
A. C. RICE.
HORIZONTAL THRUST BEARING.
No. 384,930. Patented June 19, 1888.
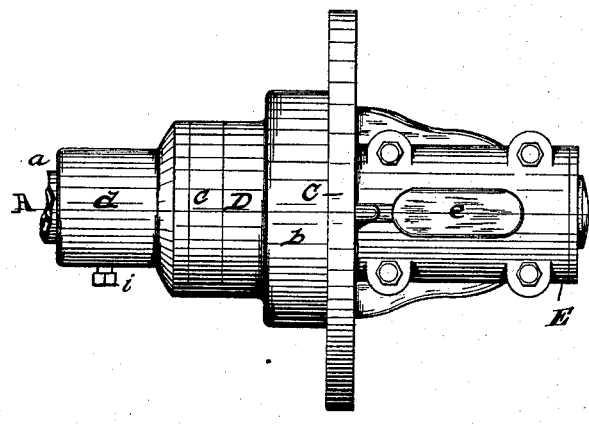
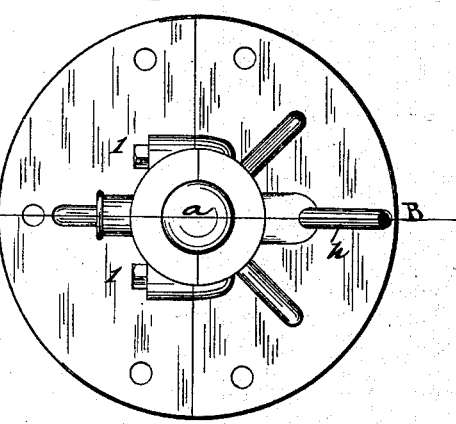
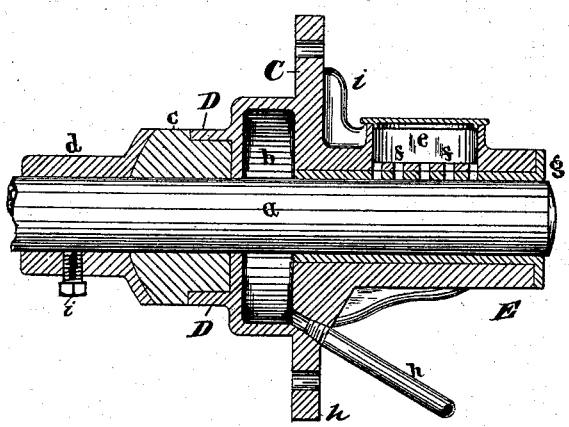
Attest
J. Watson Sims
T. Simmons.
Inventor,
Alva C. Rice.
by Wood & Boyd
his Attorneys &c

United States Patent Office.

ALVA C. RICE, OF DAYTON, OHIO, ASSIGNOR TO THE STILWELL & BIERCE MANUFACTURING COMPANY, OF SAME PLACE.

HORIZONTAL THRUST-BEARING.

SPECIFICATION forming part of Letters Patent No. 384,930, dated June 19, 1888.

Application filed March 6, 1888. Serial No. 266,360. (No model.)

*To all whom it may concern:*

Be it known that I, ALVA C. RICE, a resident of Dayton, in the county of Montgomery and State of Ohio, have invented certain new and useful Improvements in Horizontal Thrust-Bearings, of which the following is a specification.

My invention relates to an oil and self-packing thrust-bearing.

The object of my invention is, first, to do away with all packing-glands; second, to provide a suitable oil-bearing to be used on a horizontal turbine water-wheel, all of which will be fully set forth in the description of the accompanying drawings, making a part of this specification, in which—

Figure 1 is a top plan view of my invention. Fig. 2 is an end elevation. Fig. 3 is a central longitudinal section on line A B, Figs. 1 and 2.

*a* represents a horizontal shaft; *b*, an air-chamber between the thrust-bearing and sleeve-bearing.

*c* is a thrust-bearing, preferably made of wood, with the end of the grain convex and fitting against the concave step *d*, which is secured to the shaft *a* by means of the set-screw *i*.

D represents an annular flange forming a socket to hold the step *c*.

*h* is a pipe entering the air-chamber *b* to carry off the water if any should pass through between the bearing *c* and the concave step *d* and shaft *a*.

C represents a flange cast on and with the sleeve E.

*g* represents Babbitt lining; *e*, an oil-chamber; *ff*, oil-holes leading from the chamber *e* to the shaft.

The body of the bearing E projects outside of the end of the flume or draft-tube and is lubricated by means of the oil-chamber *e*. The flange C is provided with holes for bolting the bearing to the end of the flume or draft-tube. The concave step *d* is surrounded by water and is lubricated by the moisture which is absorbed by the wood. The water on the outside also assists in keeping the parts cool.

The result which I accomplish by my invention is keeping the water away from the oil-bearing and also preventing the vacuum in the draft-tube from drawing the oil out of the bearing, obtaining a tight step or thrust-joint.

Having described my invention, what I claim is—

1. In combination with a shaft, the journal-box composed of the sleeve-journal E, having the annular flange D, step *c*, and bearing *d*, secured to the shaft, substantially as specified.

2. In combination with the step *c*, shaft *a*, and bearing *d*, the journal-box E, provided with air chambers *b*, substantially as specified.

3. In combination with the shaft, the step *c*, bearing *d*, sleeve-journal E, provided with the air-chamber *b*, and pipe *h*, tapping said chamber, substantially as specified.

4. In combination with the shaft *a*, bearing *d*, and step *c*, the journal E, provided with the flange C, substantially as specified.

5. In combination with the shaft *a*, bearing *d*, and step *c*, the journal E, provided with the flange C, and lubricating-cup *e*, substantially as specified.

In testimony whereof I have hereunto set my hand.

ALVA C. RICE.

Witnesses:
 WEBSTER W. SHERRY,
 E. K. STILWELL.